(12) United States Patent
Pearson

(10) Patent No.: US 12,369,740 B2
(45) Date of Patent: Jul. 29, 2025

(54) COOKING APPARATUS USING LIQUID BATH

(71) Applicant: Carl P. Pearson, Edmonds, WA (US)

(72) Inventor: Carl P. Pearson, Edmonds, WA (US)

( * ) Notice: Subject to any disclaimer, the term of this patent is extended or adjusted under 35 U.S.C. 154(b) by 186 days.

(21) Appl. No.: 17/108,337

(22) Filed: Dec. 1, 2020

(65) Prior Publication Data
US 2021/0076861 A1   Mar. 18, 2021

Related U.S. Application Data

(63) Continuation of application No. 13/840,534, filed on Mar. 15, 2013, now Pat. No. 10,863,848.

(51) Int. Cl.
*A47J 27/00* (2006.01)
*A47J 27/024* (2006.01)
*A47J 27/10* (2006.01)

(52) U.S. Cl.
CPC ........... *A47J 27/002* (2013.01); *A47J 27/024* (2013.01); *A47J 27/10* (2013.01)

(58) Field of Classification Search
CPC ........ A47J 27/002; A47J 27/024; A47J 27/10; A47J 27/18; A47J 31/46; F04B 17/00; F04B 39/00
See application file for complete search history.

(56) References Cited

U.S. PATENT DOCUMENTS

| | | |
|---|---|---|
| 3,332,338 A | 7/1967 | Wein |
| 3,742,178 A | 6/1973 | Harnden, Jr. |
| 3,888,303 A | 6/1975 | Skala |
| 3,908,111 A | 9/1975 | Du Bois |
| 4,762,060 A | 8/1988 | Santa Cruz |
| 5,097,759 A | 3/1992 | Vilgrain et al. |
| 5,123,337 A | 6/1992 | Mlgrain |
| 5,280,748 A | 1/1994 | Pardo |
| 5,340,471 A | 8/1994 | Wilson |
| 5,361,683 A | 11/1994 | Silvestrini |
| 5,421,246 A | 6/1995 | Tippmann et al. |
| 5,445,062 A | 8/1995 | Polster |
| 5,542,344 A | 8/1996 | Koether |

(Continued)

FOREIGN PATENT DOCUMENTS

WO    WO-2007122900 A1 *  11/2007 ............. A47J 36/28

OTHER PUBLICATIONS

"Cook Salmon Sous-Vide in Your Kitchen Sink for No-Fuss, Healthy Eats." https://lifehacker.com/ cook-salmon-sous-vide-in-your-kitchen-sink-for-no-fuss-5830856. Aug. 15, 2011 (Year: 2011).*

(Continued)

*Primary Examiner* — Brian W Jennison
*Assistant Examiner* — Kevin Guanhua Wen
(74) *Attorney, Agent, or Firm* — Lee & Hayes, P.C.

(57) ABSTRACT

A water bath system for cooking includes a conventional kitchen sink for 1) a dish washing mode of operation with heated water and 2) a sous vide cooking mode of operation, including a heating unit for heating water in the sink, a temperature sensor and a control unit connected to the heating unit and responsive to the temperature of the liquid to maintain the liquid in the kitchen sink at a specific temperature for cooking food inside a cooking bag or container and immersed in the liquid bath for sous vide cooking.

20 Claims, 19 Drawing Sheets

(56) References Cited

U.S. PATENT DOCUMENTS

| | | | | |
|---|---|---|---|---|
| 6,056,985 | A * | 5/2000 | Fluckiger | B65D 75/52 374/137 |
| 6,505,546 | B1 | 1/2003 | Koether et al. | |
| 7,376,485 | B2 * | 5/2008 | Salerno | G06Q 10/06 700/211 |
| 10,863,848 | B2 | 12/2020 | Pearson | |
| 2005/0044625 | A1 * | 3/2005 | Kommers | G05D 23/19 4/654 |
| 2005/0121434 | A1 | 6/2005 | Kim | |
| 2007/0006376 | A1 * | 1/2007 | Bartosik | A47K 3/00 4/541.1 |
| 2008/0066624 | A1 | 3/2008 | Taylor | |
| 2008/0260557 | A1 * | 10/2008 | Austin et al. | F04B 17/00 417/423.3 |
| 2009/0049992 | A1 | 2/2009 | Chien | |
| 2009/0126580 | A1 | 5/2009 | Hartfelder et al. | |
| 2010/0269341 | A1 | 10/2010 | Stewart et al. | |
| 2010/0326286 | A1 * | 12/2010 | Romero | A47J 27/18 99/330 |
| 2010/0326623 | A1 * | 12/2010 | Azzam | F24J 3/08 165/45 |
| 2011/0017078 | A1 | 1/2011 | O'Connell | |
| 2011/0117259 | A1 * | 5/2011 | Storek | A47J 36/00 99/330 |
| 2011/0175737 | A1 * | 7/2011 | Pforte | G05D 23/1931 340/584 |
| 2011/0185915 | A1 * | 8/2011 | Eades | A47J 27/21058 99/331 |
| 2011/0186283 | A1 * | 8/2011 | Preston | B01L 7/02 165/47 |
| 2011/0247970 | A1 * | 10/2011 | Evingham | B01D 35/26 210/85 |
| 2014/0260998 | A1 | 9/2014 | Pearson | |
| 2020/0397175 | A1 | 12/2020 | Pearson | |
| 2020/0397176 | A1 | 12/2020 | Pearson | |

OTHER PUBLICATIONS

Office Action for U.S. Appl. No. 17/011,616, mailed on Jan. 23, 24, Carl P. Pearson, "Cooking Apparatus Using Liquid Bath," 45 pages.

Office Action for U.S. Appl. No. 13/840,534, mailed on Jan. 31, 2020, Carl P. Pearson, "Cooking Apparatus Using Liquid Bath," 45 pages.

Office Action for U.S. Appl. No. 17/011,616, mailed on Jan. 31, 2023, Carl P. Pearson, "Cooking Apparatus Using Liquid Bath," 47 pages.

Office Action for U.S. Appl. No. 17/011,782, mailed on Feb. 16, 2023, Carl P. Pearson, "Cooking Rack System Using Liquid Bath", 21 pages.

Office Action for U.S. Appl. No. 17/011,782, mailed on Apr. 28, 2023, Carl P. Pearson, "Cooking Rack System Using Liquid Bath," 28 pages.

Office Action for U.S. Appl. No. 13/840,534, mailed on May 16, 2019, Carl P. Pearson, "Cooking Apparatus Using Liquid Bath," 44 pages.

Office Action for U.S. Appl. No. 13/840,534, mailed on May 18, 2016, Carl P. Pearson, "Cooking Apparatus Using Liquid Bath," 25 pages.

Office Action for U.S. Appl. No. 17/011,616, mailed on May 26, 2023, Carl P. Pearson, "Cooking Apparatus Using Liquid Bath," 22 pages.

Office Action for U.S. Appl. No. 13/840,534, mailed on Jun. 12, 2017, Carl P. Pearson, "Cooking Apparatus Using Liquid Bath," 32 pages.

Office Action for U.S. Appl. No. 13/840,534, mailed on Jul. 13, 2020, Carl P. Pearson, "Cooking Apparatus Using Liquid Bath," 72 pages.

Office Action for U.S. Appl. No. 17/011,616, mailed on Aug. 9, 2023, Carl P. Pearson, "Cooking Apparatus Using Liquid Bath," 43 pages.

Office Action for U.S. Appl. No. 17/011,616, mailed on Oct. 5, 2022, Carl P. Pearson, "Cooking Apparatus Using Liquid Bath," 39 pages.

Office Action for U.S. Appl. No. 17/011,782, mailed on Oct. 11, 2022, Carl P. Pearson, "Cooking Rack System Using Liquid Bath," 29 pages.

Office Action for U.S. Appl. No. 13/840,534, mailed on Oct. 31, 2016, Carl P. Pearson, "Cooking Apparatus Using Liquid Bath," 26 pages.

Office Action for U.S. Appl. No. 13/840,534, mailed on Nov. 21, 2018, Carl P. Pearson, "Cooking Apparatus Using Liquid Bath," 37 pages.

Office Action for U.S. Appl. No. 13/840,534, mailed on Dec. 7, 2017, Carl P. Pearson, "Cooking Apparatus Using Liquid Bath," 35 pages.

Office Action for U.S. Appl. No. 17/011,616, mailed on May 10, 2024, Pearson, "Cooking Apparatus Using Liquid Bath", 39 Pages.

Office Action for U.S. Appl. No. 17/011,616, mailed on Nov. 15, 2024, Pearson, "Cooking Apparatus Using Liquid Bath," 53 pages.

* cited by examiner

COOKING APPARATUS USING LIQUID BATH

PRIOR APPLICATION

This is a continuation of U.S. patent application Ser. No. 13/840,534 filed Mar. 15, 2013.

TECHNICAL FIELD

This invention relates generally to cooking appliances/systems, and more particularly concerns such appliances and/or systems using a water/liquid bath.

BACKGROUND OF THE INVENTION

In the various fields of cooking techniques and appliances, a hot water/liquid bath has been used to cook food using very accurate water temperatures. Typically the cooking occurs over a relatively long period of time, up to 72 hours in some cases, and at low temperatures, with the food submerged in plastic bags and typically vacuum-sealed. Examples of food cooked include all types of meat and fish, chicken, eggs and vegetables. Fish, eggs and tender cuts of meat and chicken may be cooked in as little as 20 minutes, up to a few hours. This cooking technique is typically known by the French term "sous vide", which means cooking under pressure. This technique has been used in fine cuisine preparation because of the precise control of the cooking temperature, producing cooking benefits which have not been achieved heretofore with traditional cooking techniques, such as baking, braising, etc. Other examples of cooking using a water/liquid bath include "bain-marle" techniques, in which a pan or inner container with food is placed in an outer container of hot water. This bain-marle technique is useful for melting chocolate, making custards and cheesecakes or holding food at serving temperatures.

A number of sous vide cooking appliances are commercially available and are suitable for home or commercial use. Some of these include dedicated stand-alone appliances, which have the disadvantage of being single-function appliances which require a lot of space on a countertop as well as for storage when not in use. Such systems must be individually filled with water, typically by hand-pouring and then must be emptied after each use. This can be both difficult and inconvenient. Since they are a fixed size, they also lack the capability to conveniently handle diverse quantities/sizes of food to be cooked.

Another sous vide appliance is an immersion circulator-style portable heater that can be clamped onto the side of a cooking pot or container. While this type of system overcomes some of the limitations of fixed container size appliances noted above, it still has significant limitations. Such a unit is quite heavy and must be securely clamped to the edge of the cooking container in order to be safely used. The overall system may become unstable if the container is too small or require a larger than desirable container to accommodate the size of the heater. The immersion system is also a single-purpose appliance that requires considerable space and must be stored when not actually in use. Typically, immersion circulator systems have fixed minimum and maximum water levels which may not be suitable for cooking certain items or for use with shallow pans. Other kitchen appliances, such as coffee makers, are single purpose and heat water for one purpose. Electric pressure cookers, rice cookers, tea kettles and crock pots are other examples of single purpose cooking appliances.

Alternatively, it would also be desirable to increase the flexibility of the minimum and maximum water levels of a water/liquid cooking appliance to adapt to various cooking requirements. Further, it would be desirable to control where the input and output ports occur and also to have multiple intake and output ports to accommodate multiple zones of cooking. Still further, it would be desirable to be able to measure the water temperature at various points within the bath and at locations very near the food bag, even within the food bag itself. In addition, it would be desirable to have a heat source which does not come into contact with the water in order to protect the heat source from damage and to eliminate extensive cleaning after each use. It would also be desirable in some situations to use an existing single purpose appliance for another cooking technique, in order to save space and eliminate the cost of another dedicated single purpose appliance.

Also, it is desirable in some cases to have a convection system for heating and dispersing hot water without the need for a separate pumping system. A limitation of existing sous vide systems is that they are all designed to heat the water bath to a single temperature and to maintain that temperature uniformly throughout the water bath. In cases where it is desirable that multiple cuts of meat be cooked to different temperatures (doneness), multiple baths would be required or a less than desirable single compromise temperature would be necessary.

DISCLOSURE OF THE INVENTION

Accordingly, a liquid based sous vide cooking system comprises a new or existing kitchen sink configured for holding an amount of water, wherein the kitchen sink is adapted for washing dishes in one mode of operation, wherein the kitchen sink is fixed or fixable in position, the kitchen sink having a bottom surface and a wall or walls extending upwardly therefrom to define an interior volume for holding the amount of water, for washing dishes therein, the kitchen sink further including a conventional kitchen sink drain in the bottom surface, which is closable by a user to maintain water in the kitchen sink and openable to permit water to completely exit therefrom, the kitchen sink further including a source of heated water delivered though a faucet or tap external to the kitchen sink at a temperature for washing dishes therein by hand, wherein the kitchen sink is characterized by an absence of a heating unit in the interior volume, the kitchen sink including at least one heating unit external to the interior volume of the sink, adapted and controlled to heat water in the interior volume of the kitchen sink to user settable temperatures over substantially an entire temperature range of 120° F.-160° F. for sous vide cooking in the kitchen sink in a second mode of operation; a temperature control unit coupled to the at least at least one heating unit; an on/off switch for the heating unit wherein in an off position thereof, the kitchen sink is for washing dishes with the heated water from the source thereof in the one mode of operation, and in an on position the water in the kitchen sink is heated to the user settable temperatures over substantially the entire range of 120° F.-160° F. for sous vide cooking in the second mode of operation; a sealed cooking bag or a sealed container, and a two part temperature sensor arrangement providing feedback to the temperature control unit when the on/off switch is in the on position, wherein the first part of the temperature sensor arrangement is adapted to monitor the temperature of the water in the kitchen sink and a second part of the temperature sensor arrangement is adapted to monitor the temperature of food being cooked in the sealed cooking bag or the sealed container which is immersed in water in the kitchen sink when the kitchen sink is used for sous vide cooking, wherein the temperature control unit is responsive to both the first and second parts of the temperature sensor arrangement together and is adapted to control the water in the kitchen sink to the user settable temperatures over substantially the entire range of 120° F.-160° F., the cooking bag or the sealed container being immersed in the water in the kitchen sink for a period of time when the on/off switch is the on position to cook the food in the sealed bag or the sealed container to a target food temperature, wherein the target food temperature is established in accordance with the food being cooked sous vide.

BEST MODE FOR CARRYING OUT THE INVENTION

FIGS. 1-15 show a first embodiment of the present invention, directed toward a sous vide water/liquid cooking appliance using a conventional sink, in particular, a kitchen sink. Kitchen sinks are typically made with a variety of materials designed to hold hot water for general domestic cleaning purposes. Water is released through a drain system. Such kitchen sinks are made in a variety of shapes. A kitchen sink is typically in a fixed location in a kitchen and occupies a significant amount of space, with many modern kitchens having more than one sink separated from each other or a double sink.

Figure 1:
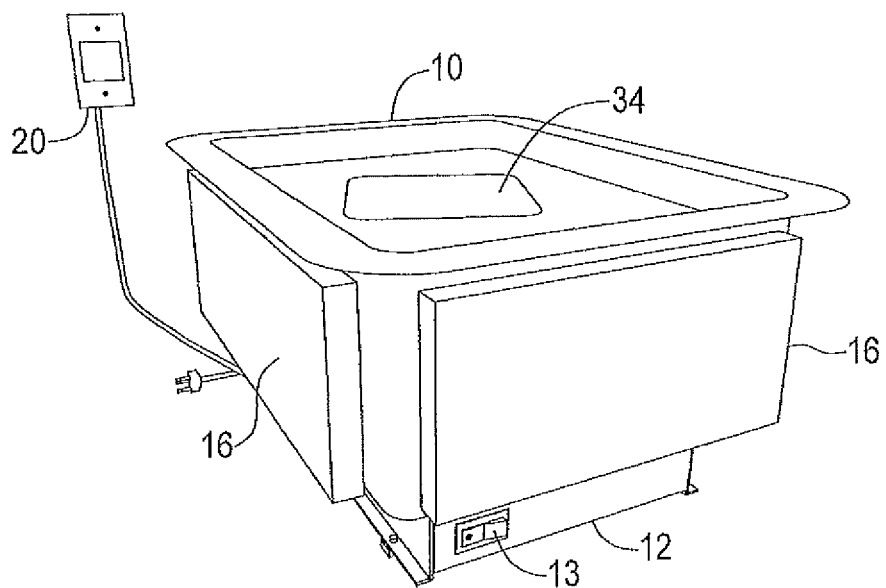
FIG. 1 is a perspective view of a sous vide appliance using a convention kitchen sink.
Figure 2:
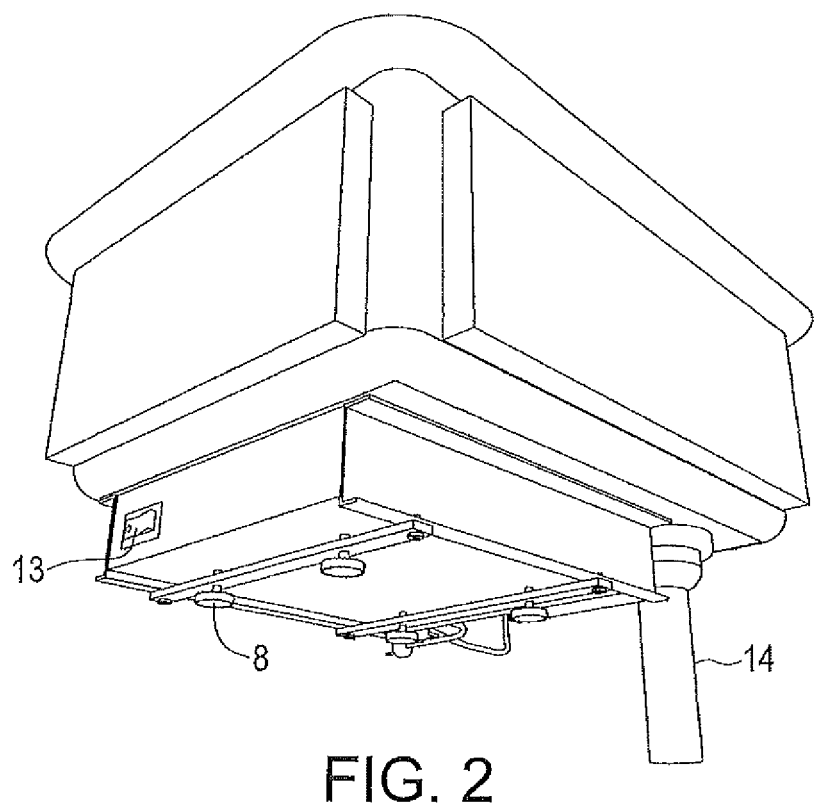
FIG. 2 is a bottom perspective view of the appliance of FIG. 1.

The present invention uses the conventional kitchen sink as a primary cooking bath. A sink is shown generally at 10 with a heating unit 12 connected to the bottom of the sink, controlled by an on-off switch 13. The sink has a conventional drain 14. The heating unit 12 as shown is an induction-style unit. While various types of heating elements can be used, if the sink is made of stainless steel or cast iron, the induction unit will be sufficient for heat transfer to the water bath within the sink. Insulating materials 16 can surround the sink. Wired temperature sensors 18 are positioned to provide temperature feedback information to an electronic controller 20. The controller would typically be incorporated into the induction heating unit 12, although it could also be located separately, as shown in FIG. 1. Wireless sensors could also be used in place of the wired sensors 18. An advantage of the wireless sensors is that they can be placed inside the food bag to monitor the temperature close to the food or the core temperature of the food, using a probe-style sensor. If a wired sensor were used to measure the core temperature of the food, the resulting hole in the food bag would typically be sealed with a waterproof adhesive tape of the like.

Figure 3:
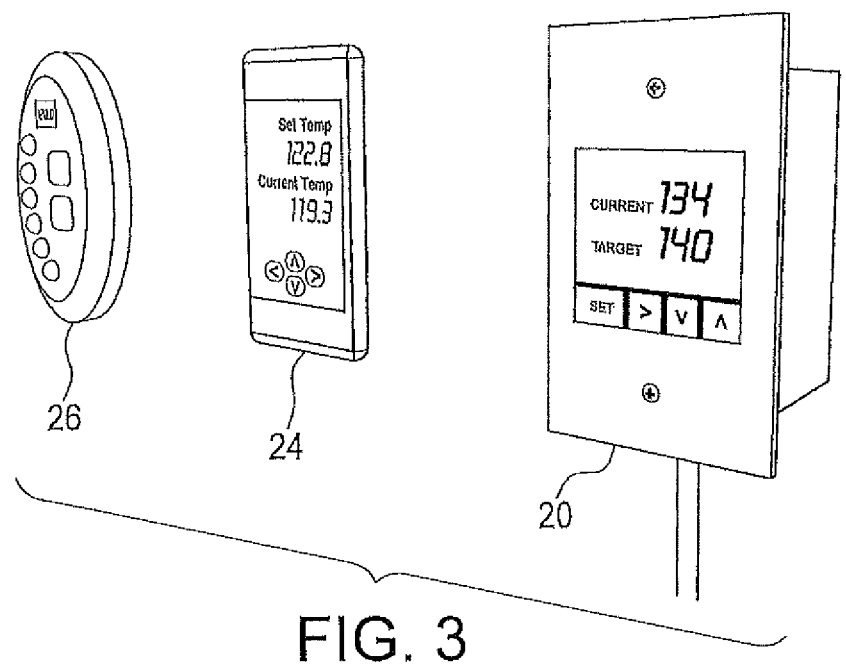
FIG. 3 is perspective views of various control units for the system of FIGS. 1 and 2.
Figure 4:
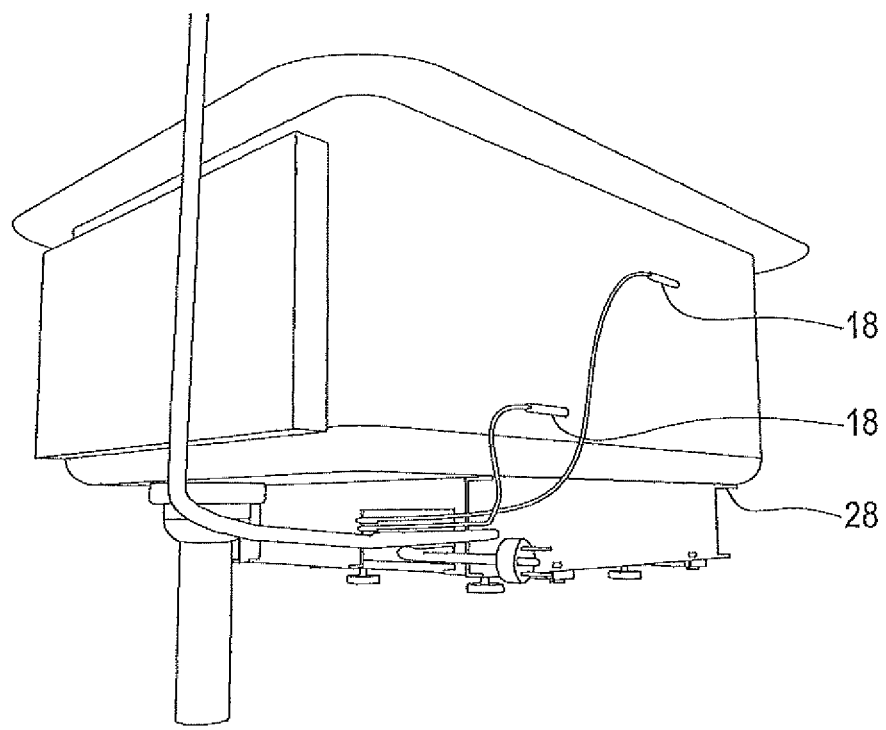
FIG. 4 is a perspective view of a sous vide kitchen sink appliance using wired sensors.

Possible controls for the system, such as shown in FIG. 3, can include a wireless remote unit 24 and a smart phone 26. It should be understood that other electronic displays could be used to monitor the cooking process in the water bath. Smart phones, tablets, pads or computers can be used with various wireless techniques, such as a Bluetooth range WiFi or information can be sent to the internet for monitoring as well, including wired connections or cellular data.

A bracket 28 for supporting the heating unit can be attached to the sink such as by welding in a factory installation or, when attached to an existing sink, high-temperature epoxy or adhesives can be used. It is important that the heating unit be designed to be installed without the need to disturb existing plumbing connections, for ease of installation.

Figure 5:
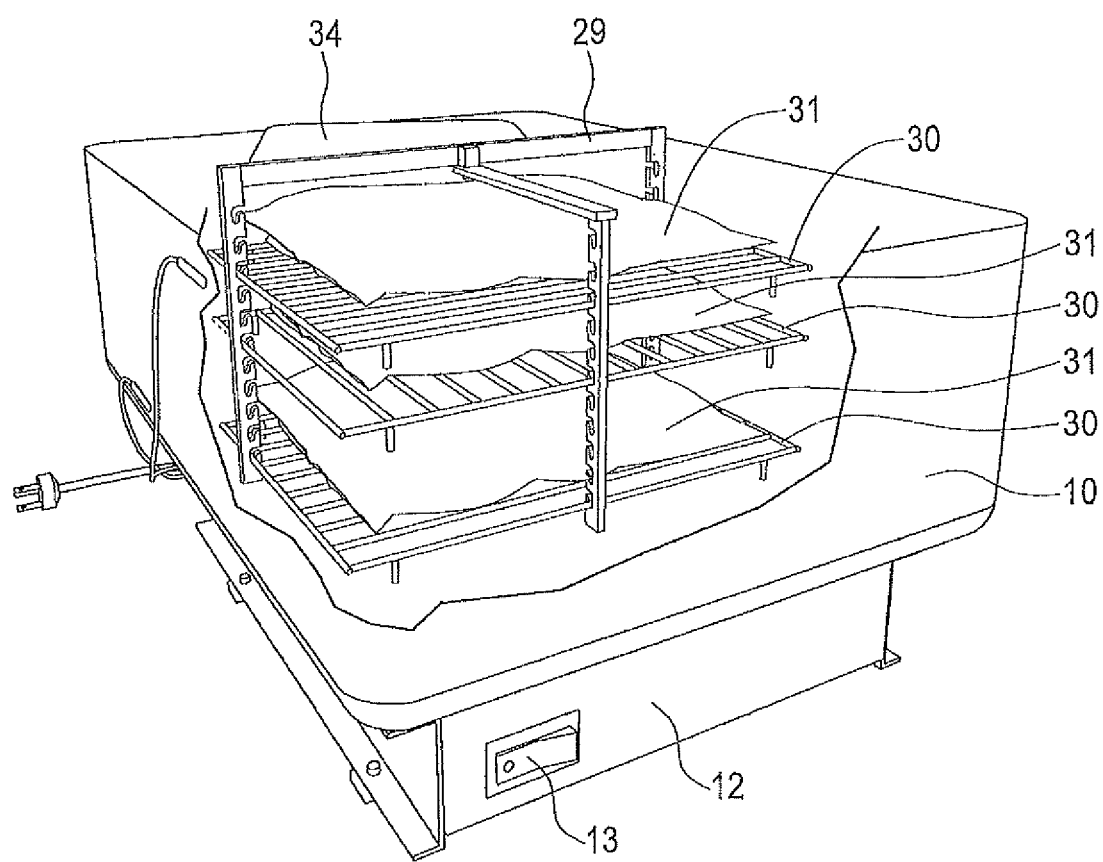
FIG. 5 is a perspective view showing the use of a sous vide appliance using multiple cooking racks.

FIG. 5 shows a cooking rack frame 29 having three separate cooking racks 30-30 for supporting individual cooking bags 31-31, each of which is supported on a separate rack. The cooking rack frame 29 is adjustable and can be raised and lowered conveniently by the user, either in or out of the water/liquid bath.

Typically, but not necessarily, the sink water/liquid bath will include a floating warning member 34 which provides a warning that the sink water is hot to the touch. Also, it should be understood that pads can be used to cover the entire sink for protection or for insulation (not shown). Additionally, other methods of insulation include the use of floating balls or other objects on the surface of the water/liquid. The sink may also have a retractable lid which is secured to the sink in some manner but can be moved out of the way to expose the sink opening, without separating the lid from the sink.

FIGS. 6-15 show embodiments which include multiple cooking temperature zones.

Figure 6:
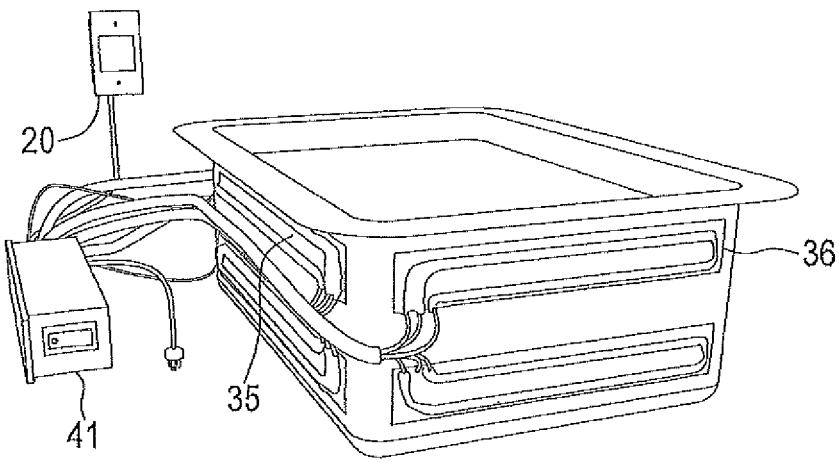
FIG. 6 is a perspective view of a sous vide appliance having multiple cooking zones.
Figure 7:
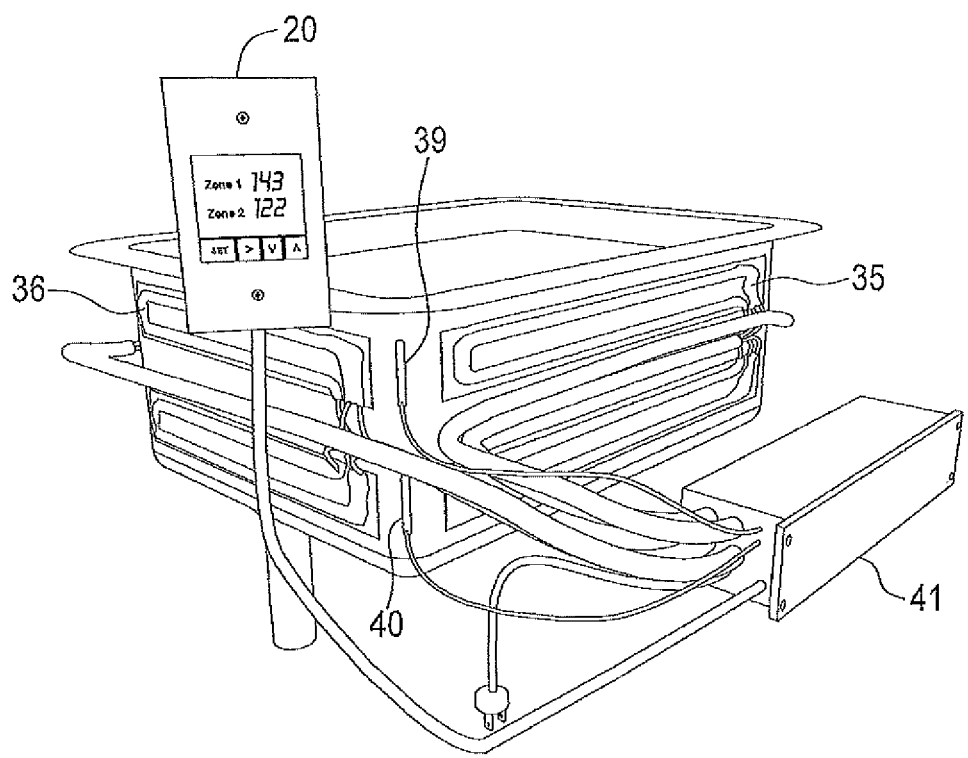
FIG. 7 shows a sous vide appliance having two heating zone, one above the other.
Figure 8:
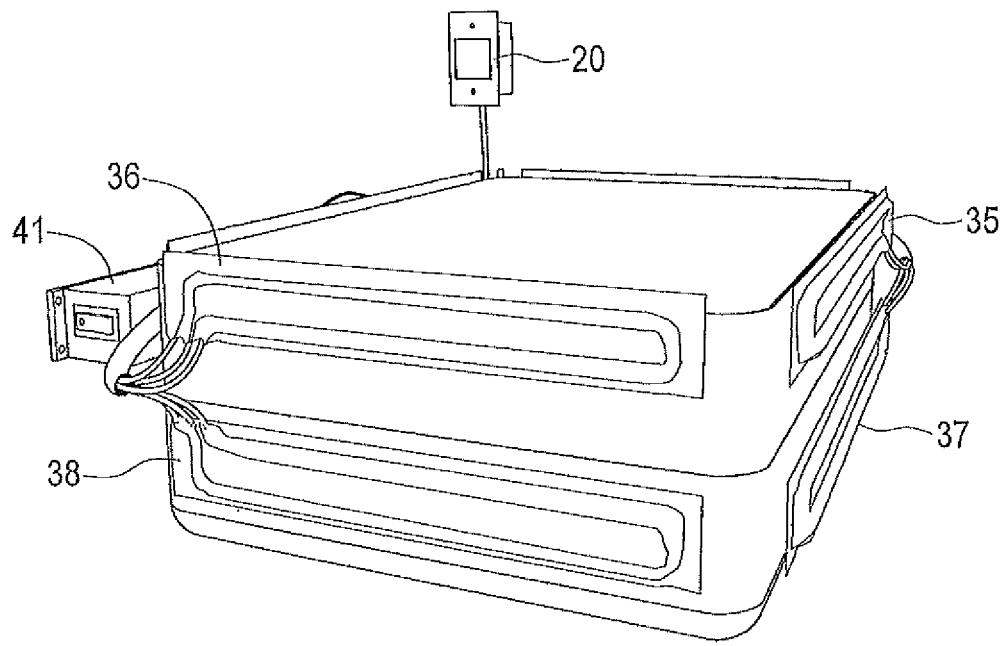
FIG. 8 is a perspective view showing the attachment of heating units to the appliance of FIG. 7.

FIG. 6-8 shows the water bath arranged to maintain two heating zones (upper and lower), so that multiple food items can be heated separately in each zone or single food items could be heated in two zones at the same time. In FIGS. 7 and 8, multiple heating elements are attached to the sides of the sink. Heating elements 35 and 36 are attached to the upper portion of the sink while heating elements 37 and 38 attached to the lower sides of the sink. Temperature sensors 39 and 40 monitor the temperature in each heating zone. Controller 41 monitors the temperature of each zone and turns on or off the individual heating elements to maintain the target heating temperature in each of the zones. FIGS. 7-8 show the two zones vertically. For example, the upper zone shown in FIG. 8 might be heated to a temperature of 143° F., suitable for beef, while the lower zone could be maintained at a temperature of 122° F., appropriate for fish. FIGS. 7-8 shows the two temperature zones being stacked or on top of each other, with equal vertical dimensions, although the vertical dimensions of the two zones need not be equal. One or both of the zones could be used for cooling as well, using cooling elements, such as Peltier thermoelectric modules.

Figure 9:
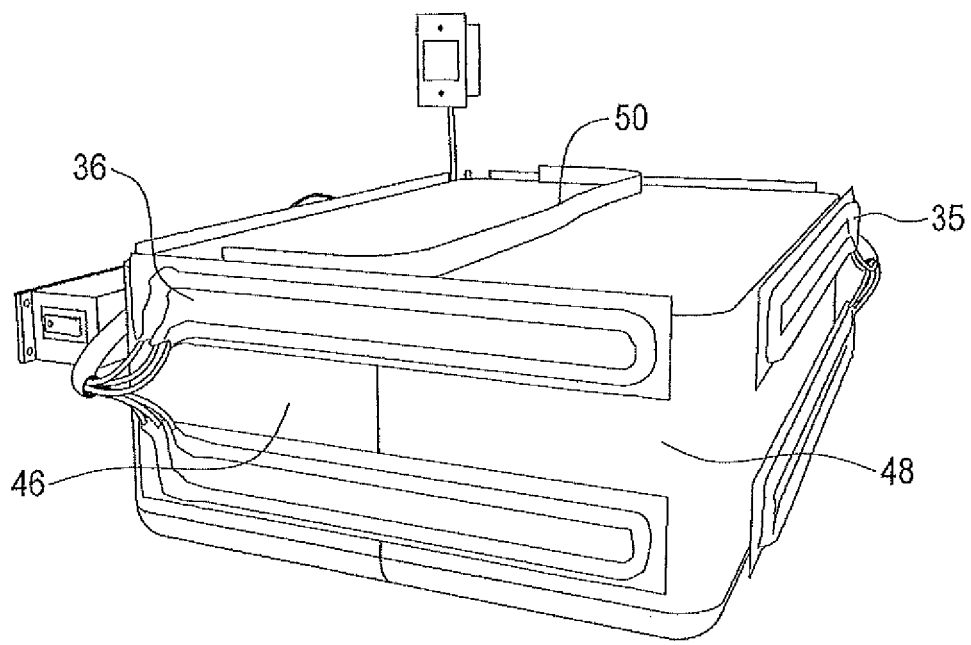
FIG. 9 is a perspective view of a sous vide appliance having two zones arranged side by side.

FIG. 9 shows two zones arranged side by side indicated at 46 and 48. A temperature isolation baffle as shown vertical at 50 will maintain the temperature isolation between zones 46 and 48. The isolation baffle 50 is held in position by suction cups, magnets or other elements. Baffle 50 could be cut to match the internal contour of the sink and placed in a position to be self-supporting. The isolation baffle could be either rigid or flexible. One example is Neoprene. The position of the isolation baffle could be adjusted to accommodate the size of food items to be cooked. The two side by side zones shown at 46 and 48 could further be controlled by upper and lower heating elements on each side referenced at 39 and 41, thereby providing a total of four different zones.

In operation, all of the heating elements can be used to bring the different zones up to the lowest target temperature. From the lowest target temperature of both zones, the controller will use the side heating zones to bring the zone up to the final temperature of that zone and maintain it. Some of the zones could be cooling as well.

Figure 10:
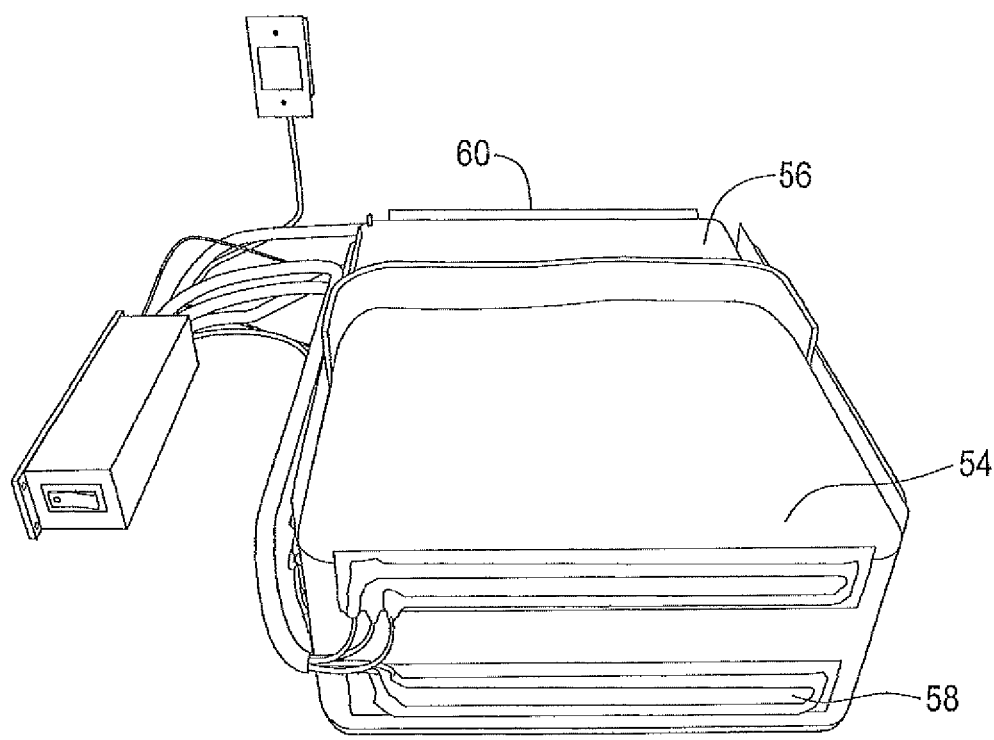
FIG. 10 is a perspective view showing a sous vide appliance having two zones front to back and two upper and lower zones.

FIG. 10 shows a different orientation, with the two zones 54 and 56 being positioned front to back and two additional upper and lower zones 58, 60 for a total of four zones.

The heating elements for these various embodiments are typically electric load style, encased in a Mylar foil for ease of application. The heating elements may be applied directly to the sink as shown or incorporated during manufacture. Other heating systems can also be used, including induction heating elements or lasers or other means. As indicated above, the temperature sensors can be positioned within the heating zones, using wired or wireless sensors, in any combination. The temperature sensors may also be positioned outside the sink and programmed or adjusted to provide an accurate temperature of the water/fluid inside the sink.

Figure 11:
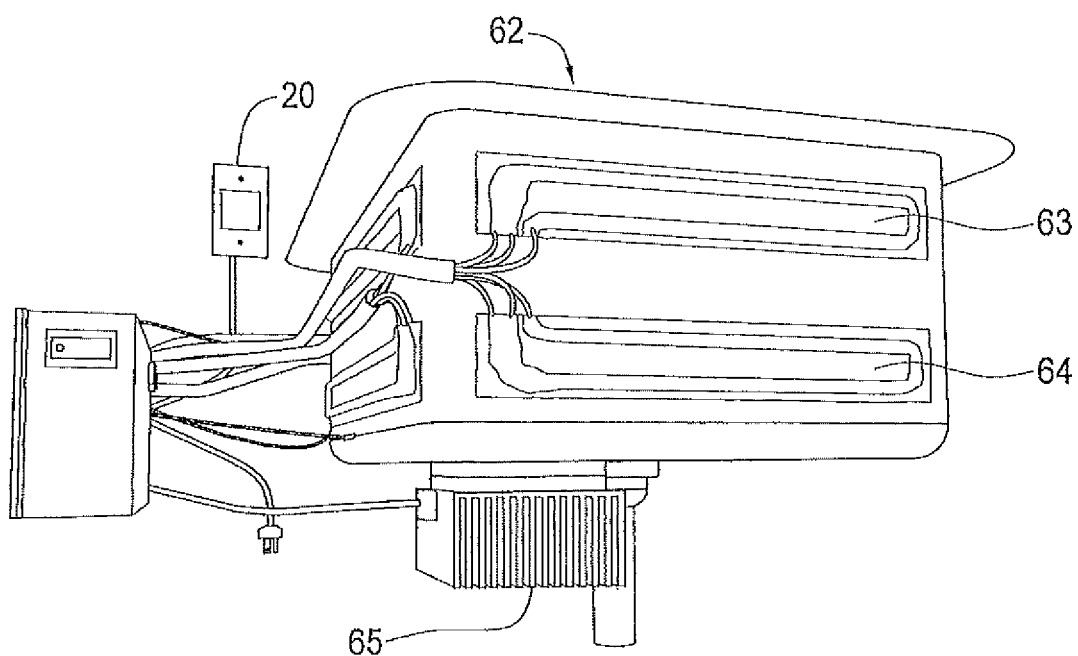
FIG. 11 is a perspective view showing a sous vide appliance with three temperature zones.

FIG. 11 shows a three-temperature zone embodiment, one on top of another. The system, referred to generally at 62, has three heating zones vertically. Heating units 63 and 64 are used for the upper two zones while the lower zone uses a Peltier thermoelectric heating and cooling module 65. In some applications, the units 63 and 64 could be replaced by Peltier thermoelectric heating and cooling modules of other heating/cooling systems to provide a greater range of temperatures in each zone. The module 65 can become either a heating or cooling module, depending upon the power supplied to the module. When the cooling unit 65 is used alone, the water bath can be used to chill food as well as drinks. Safe food handling practices include the use of an ice or chilling bath after the food is cooked to quickly reduce the temperature of the food before storing it in a refrigerator or freezer. While this is common practice in commercial food handling, it is often overlooked in the home kitchen. In the present system, the hot water/liquid is easily drained from the sink and replaced with cold water. The chilling cycle is turned on, eliminating the need for adding ice. Chilling may also be accomplished with a variety of options, including conventional compressors and refrigeration systems. Chilled gel or other cooling packs or containers may also be positioned inside or outside of the sink for cooling.

Further, prior to the water bath being heated to a target temperature, a food item may be held at a safe cool temperature. At a scheduled time, the cooling bath can be turned off and the heating process begun. The use of a cooling module increases the range of possible temperature targets. The cooling module 65 at the bottom of the sink with heating elements at the upper side of the sink creates a natural convergence zone of the water temperature gradient.

Figure 12:
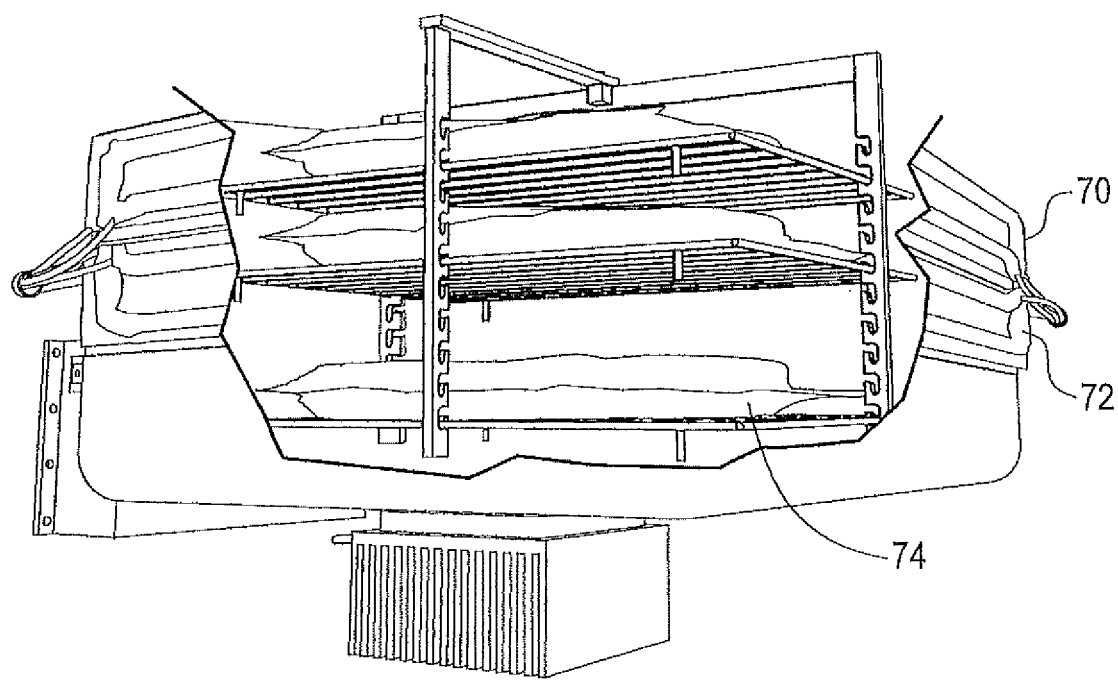
FIG. 12 shows a sous vide appliance with individual food items in different zones.

Each zone may be targeted and displayed separately for monitoring. FIG. 12 shows individual food items. As one example, beef steaks in upper zone 70 could be set for well done at 160° F., intermediate zone 72 for medium at 140° and lower zone 74 for 120° for rare. In sous vide cooking, the target temperature of the water bath is typically set at 1° or 2° higher than the final food serving temperature desired. If a probe is positioned in the food item, then the target temperature is set to the final serving temperature. Temperature monitoring may be accomplished using a single sensor or combination of sensors, positioned within the sink or outside the sink. Various temperature sensing technologies, including infrared, may be used. After the desired cooking time and temperature is achieved, the food may continue to be held at the proper temperature until it is served.

Another common problem is keeping dish water hot enough over a period of time to properly clean dishes in the sink. The present system will maintain water at the desired temperature as long as needed, eliminating the need to drain the cooled dish water and replace it again with hot water from the tap.

Figure 13:
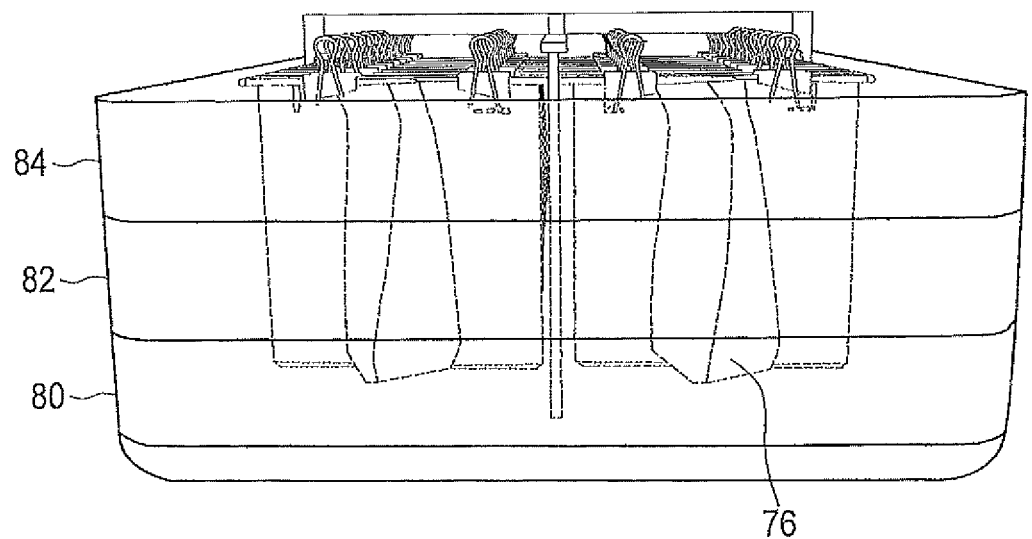
FIG. 13 is a perspective view of a sous vide appliance showing cooking items with multiple temperature zones.
Figure 14:
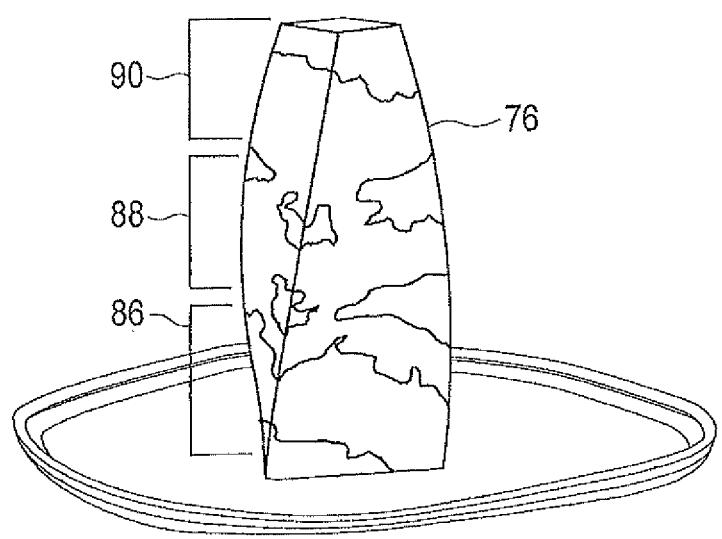
FIG. 14 is a front elevational view of an item having three zones with different temperatures.

Multi-temperature items can be accommodated readily with the two or three-layer system. FIG. 13, for instance, shows a single food item 76 with a wide range of temperatures, textures and flavors, such as for instance, a hot fudge sundae. One possibility would be using three zones 80, 82, 84, such as shown in FIG. 14, where the bottom layer 86 of the sundae could be cold, frosty or frozen, while the middle layer 88 could be warm, soft and smooth and the top layer 90 hot or silky. While a multi-temperature zone system is shown here with two or three zones, the number of zones may be increased as required by various specific cooking techniques. The size of the zones may be increased as well.

Figure 15A:
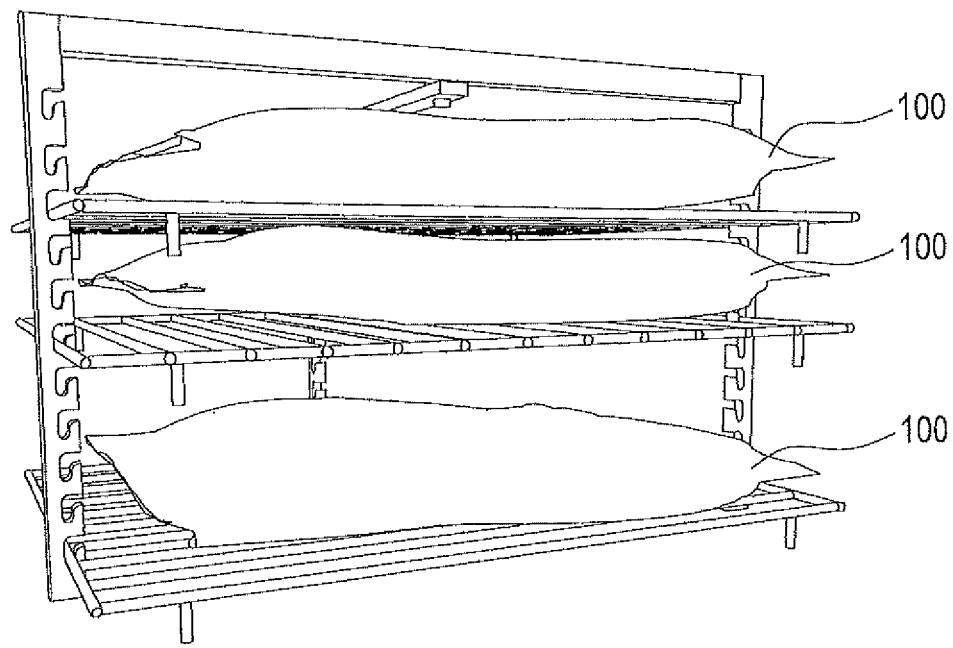
FIG. 15A is a perspective view showing cooking bags in a horizontal position.
Figure 15B:
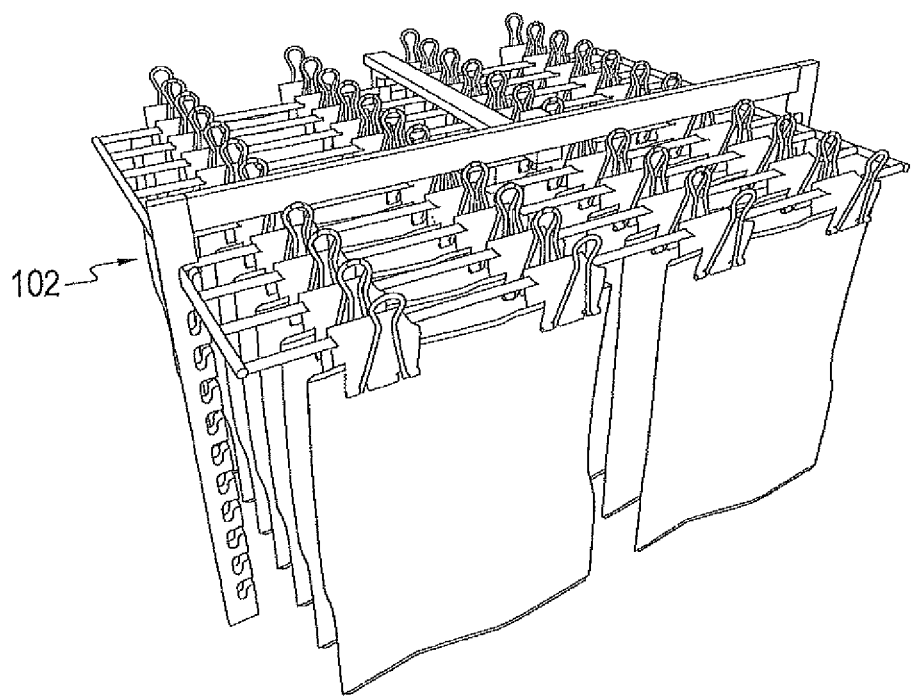
FIG. 15B shows cooking bags in a vertical position.
Figure 15C:
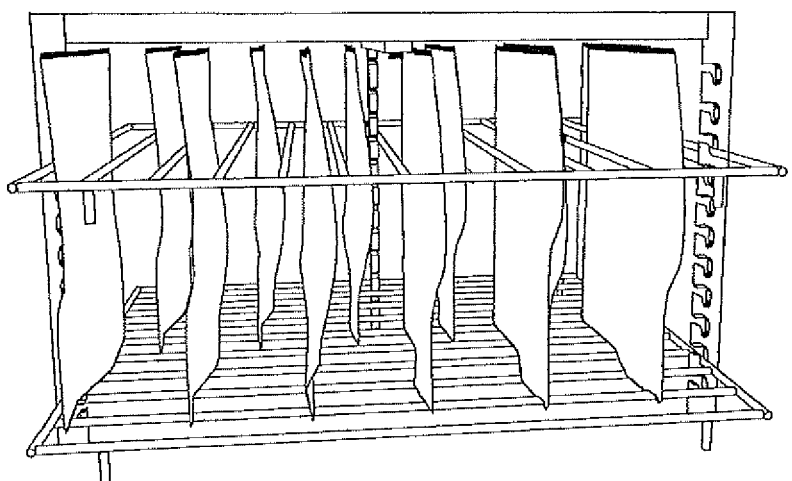
FIG. 15C shows food bags in a vertical position held in position by racks.
Figure 15D:
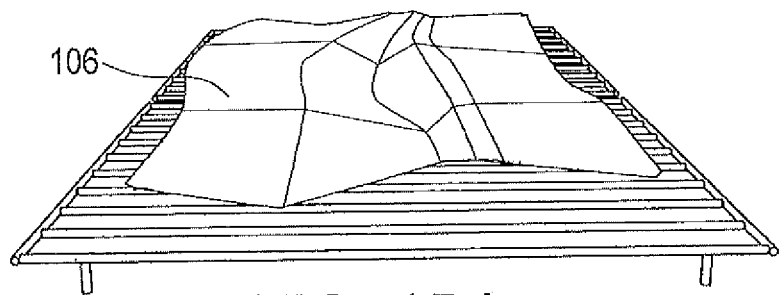
FIG. 15D is a perspective view showing the position of large food items on a rack.
Figure 15E:
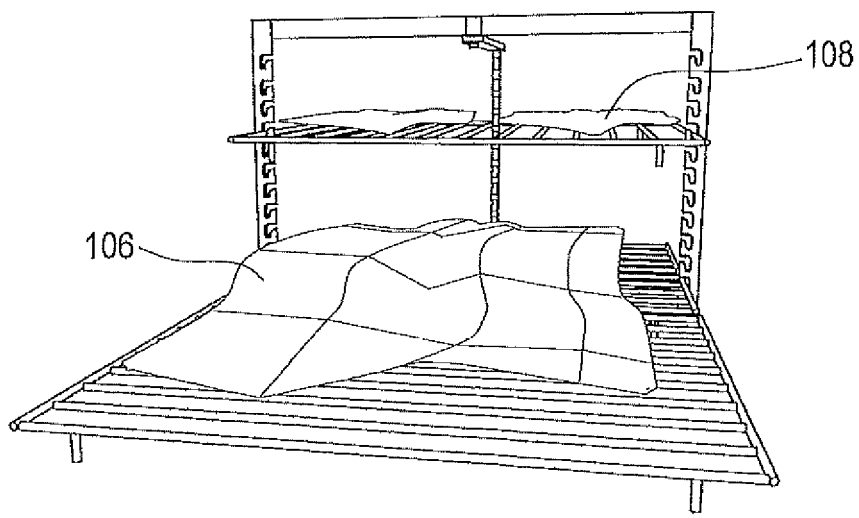
FIG. 15E is a perspective view showing another arrangement of large food items on multiple racks.
Figure 16A:
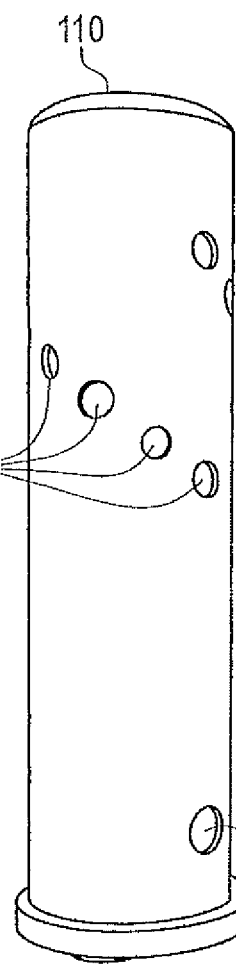
FIG. 16A is a front elevational view of a recirculation pump used in a sous vide appliance.
Figure 16B:
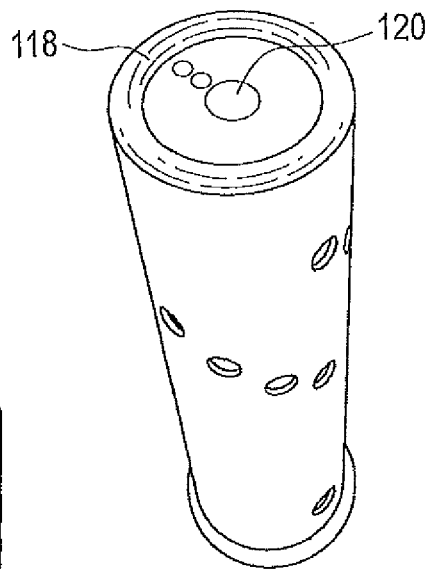
FIG. 16B is an upper perspective view of the recirculation pump of FIG. 16A.
Figure 16C:
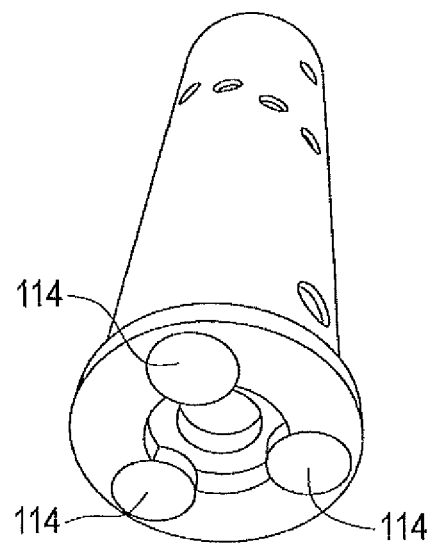
FIG. 16C is a lower perspective view of the recirculation pump of FIGS. 16A and 16B.
Figure 16D:
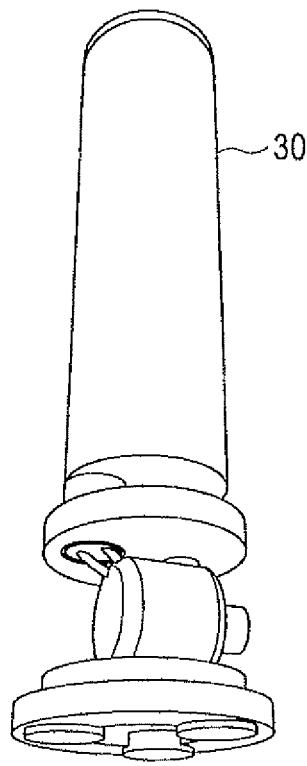
FIG. 16D is a perspective view showing the recirculation pump without the housing.
Figure 16E:
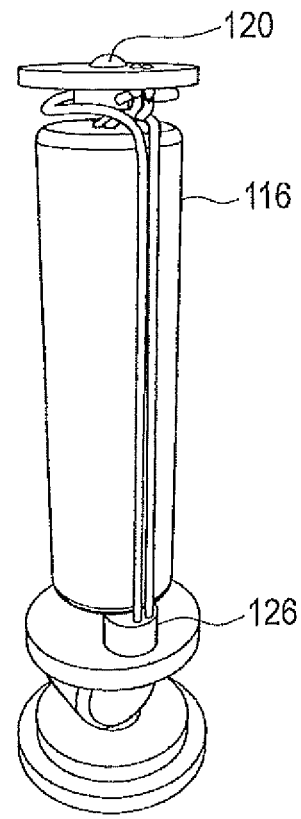
FIG. 16E is another view of the recirculation pump.

The potential cooking racks designed to hold in position food in bags are shown in FIGS. 15a-15e. Food in bags 100 may be positioned both horizontally, as shown in FIG. 15a, or vertically, as shown in FIG. 15b, to accommodate various cooking techniques with multiple-zone configurations. For instance, the entire food rack 102 can be loaded with food outside of the water bath and then positioned in the water bath fully loaded. FIGS. 15b-15c show arrangements where the food bags are positioned vertically, held by clips or held in position in racks, while FIGS. 15d and 15e show arrangements by which large food items 106 can be cooked either individually or with smaller items 108, demonstrating the versatility of the present system.

FIGS. 16a-16e show a recirculation pump 110 which is useful when the water bath is to be maintained at a uniform temperature throughout a heating zone. The pump is positioned in either a vertical or horizontal orientation, provided that the water intake opening 112 is below the water level. Magnet 114 on the bottom of the pump attaches the pump to a stainless steel or cast iron sink. Otherwise, suction cups or other attachment elements can be used. Pump 66 may include a battery 116 and a charging port 118 for the battery. An on/off switch 120 is shown in FIG. 20B. The pump moves water to the outlet ports 124. It is preferable that ports 124 be arranged around the circumference of the pump and at different heights. The pump 110 produces an even water distribution, resulting in a more even temperature zone. In operation, water is moved passed the intake separator 126, then flows between the battery case housing 130 and the outer case housing 132.

Figure 17:
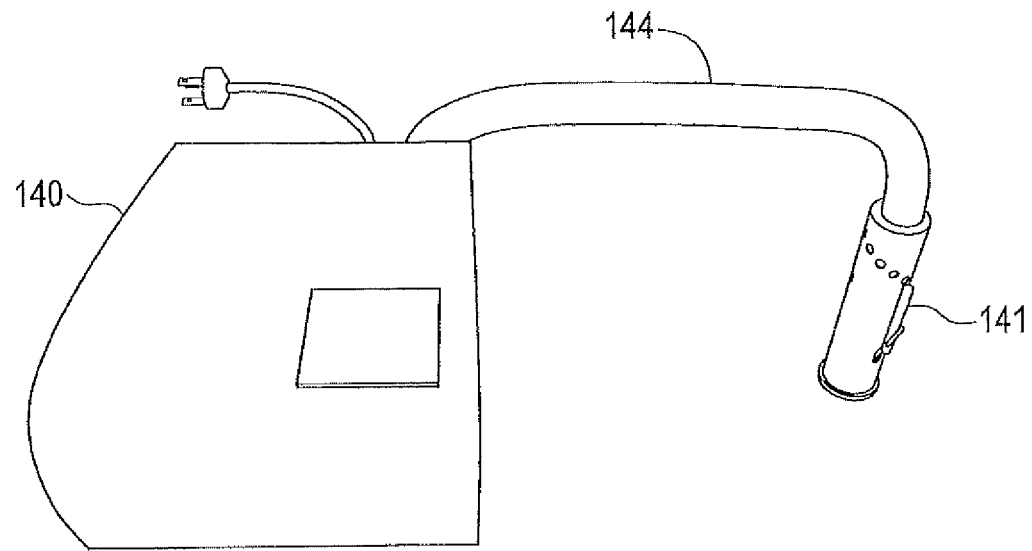
FIG. 17 is perspective view of a heating unit for a sous vide liquid container.
Figure 25:
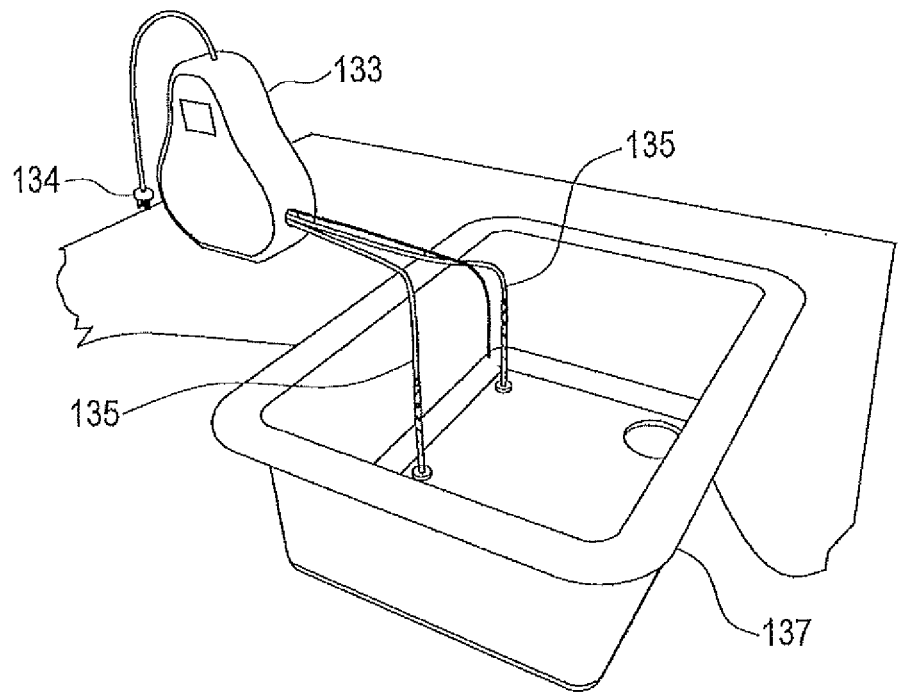
FIG. 25 is a perspective view of another embodiment of a sous vide kitchen sink appliance.

FIG. 25 shows an alternative embodiment to the embodiments of FIGS. 1-15. FIG. 17 includes an integrated heater control assembly 133, with a plug 134 which in use is connected to the source of power. Extending from the heater control unit, which is in the modern shape of a pear, the water distribution lines are shown at 134 and 135. They are attached via magnetic bases 135 and 136 to the sink 137. A temperature sensor 138 extends from the heater/control unit.

Figure 18:
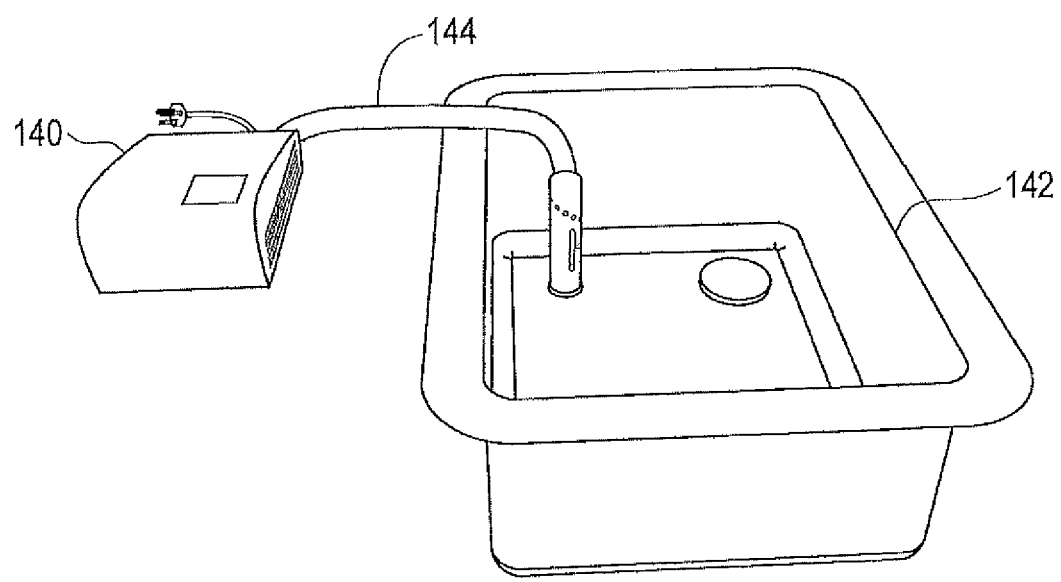
FIG. 18 is a perspective view showing the heater of FIG. 17 used with a sink.
Figure 19:
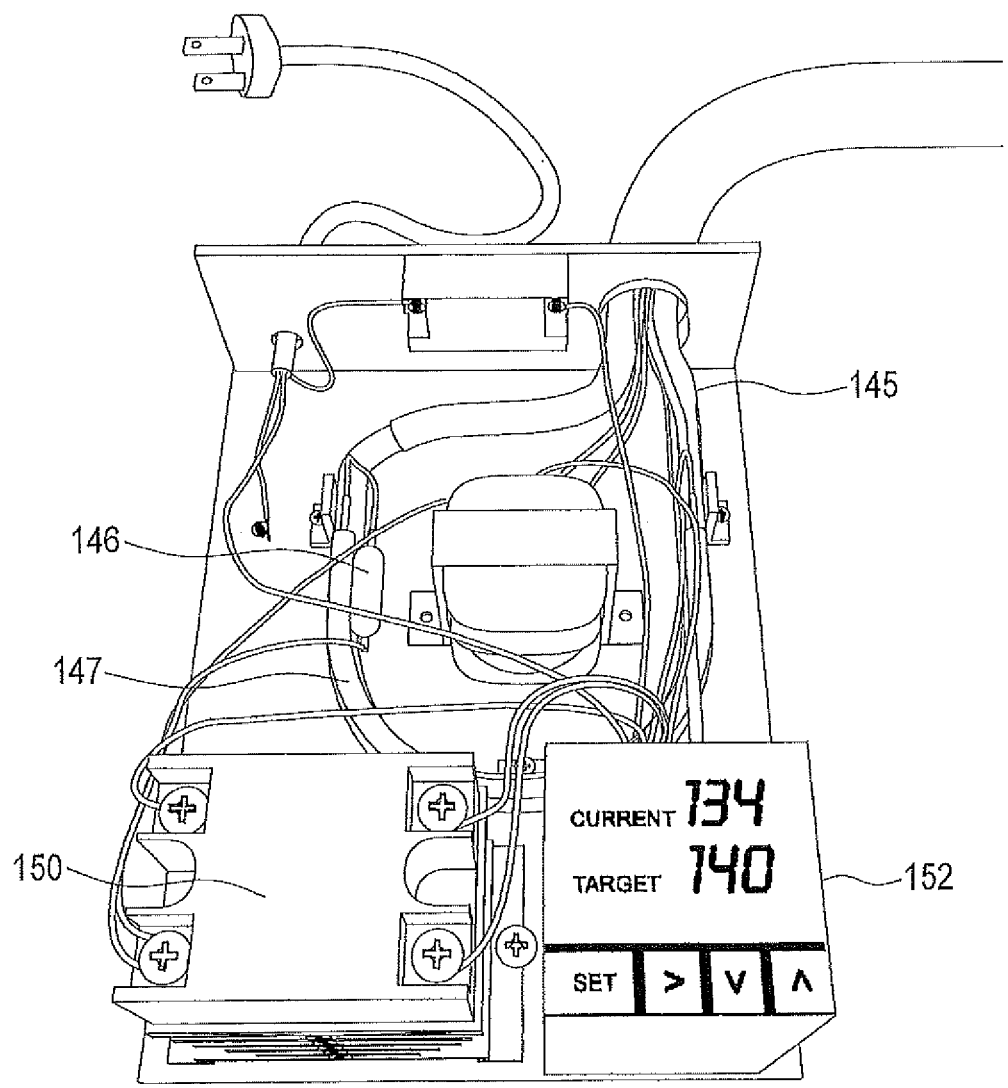
FIG. 19 is a perspective view showing a complete sous vide control system for the embodiments of FIGS. 17 and 18.

A portable heating unit for a sink or other container is shown in FIGS. 17-19. The portable heating unit can be used with any sink 142 (FIG. 18) as an alternative to permanently attaching a heating unit to the sink, as shown in FIGS. 1-15. This embodiment includes a heating and control unit 140 and a water exchange unit 141. A flexible hose or similar member 144 connects unit 140 with unit 142. In FIG. 19, water from the hot water bath is typically pumped through an inlet line 145 and through or by a heating element 147 and then returns to the hot water bath. A thermo fuse 146 is shown for protection. A solid-state relay 150 operates the heating unit and the pump, and the controller 152.

Figure 20:
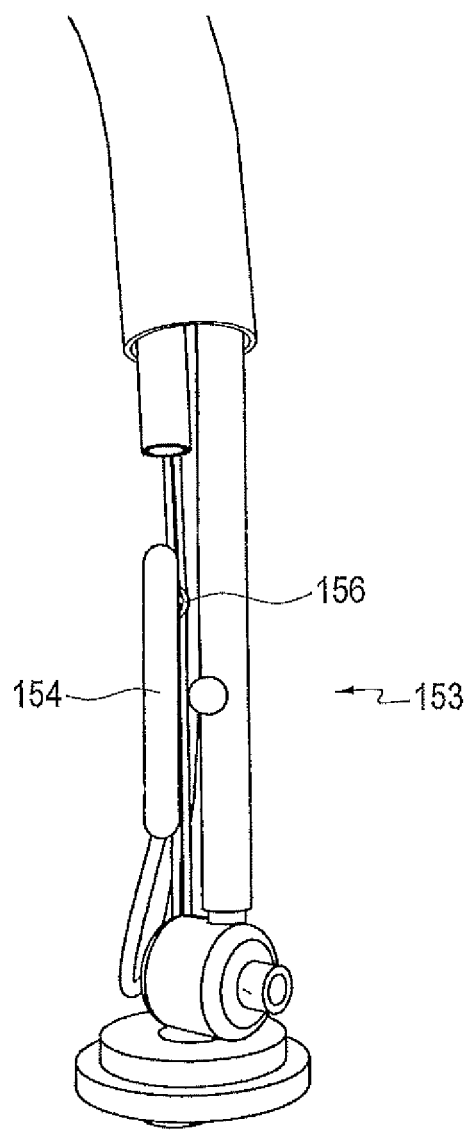
FIG. 20 is an elevational view of the submersible pump for the embodiment of FIGS. 17-19.

The water exchange system is shown in FIG. 20, using a submersible pump 153. A temperature sensor probe 154 is attachable by means of a magnet 156. The portable heating unit can be readily moved from sink to sink or location to location. In some situations the system may use a self-priming pump or pumps in place of, or in combination with the submersible pump or pumps 153 to allow greater flexibility in placement and size of the pump, such as in the housing 140 (FIG. 17). The pump could also be controlled independently of the solid-state relay 150 to provide continuous circulation. A self-priming pump may tend to be louder during operation than a submersible style pump that is not self-priming. In some situations where a quieter operation is desirable, a submersible pump could be in the housing 140 (FIG. 17) used for circulation in combination with a self-priming pump to lift the water to the housing. While a single flexible hose housing 144 is shown containing both the hot water outflow and cold water return tubes, in some cases the tubing could be separate and independently positioned for certain cooking requirements. The hot water output and the cold water return may be positioned with a variety of attachments or distribution devices. For example, tubing may be part of a cooking rack which would be suitable for very shallow water cooking such as for bain-marle style custards or crème brulee. For larger containers, more than one water distribution port may be used, as well as multiple water return ports. Likewise the location of temperature sensor probes could be positioned as desired.

Figure 26:
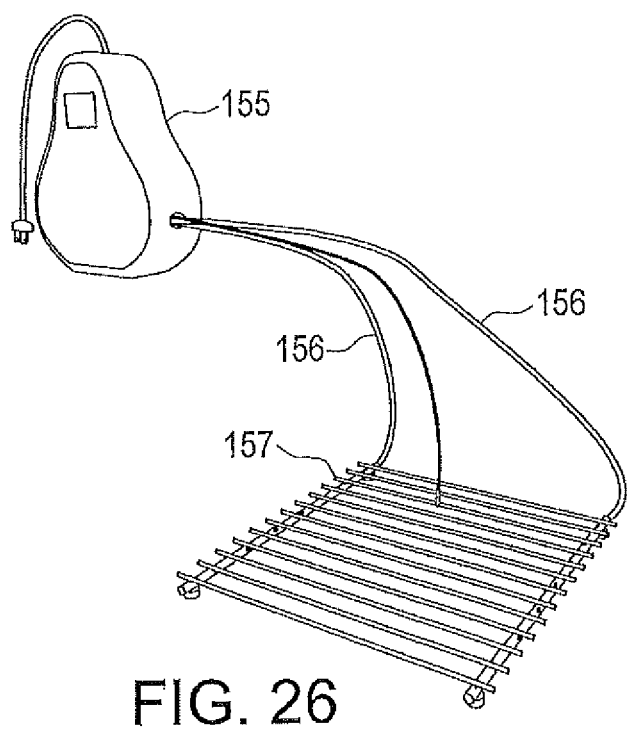
FIG. 26 is a perspective view of a heating/cooling unit in combination with a tube/cooking rack arrangement for a sous vide appliance.
Figure 27:
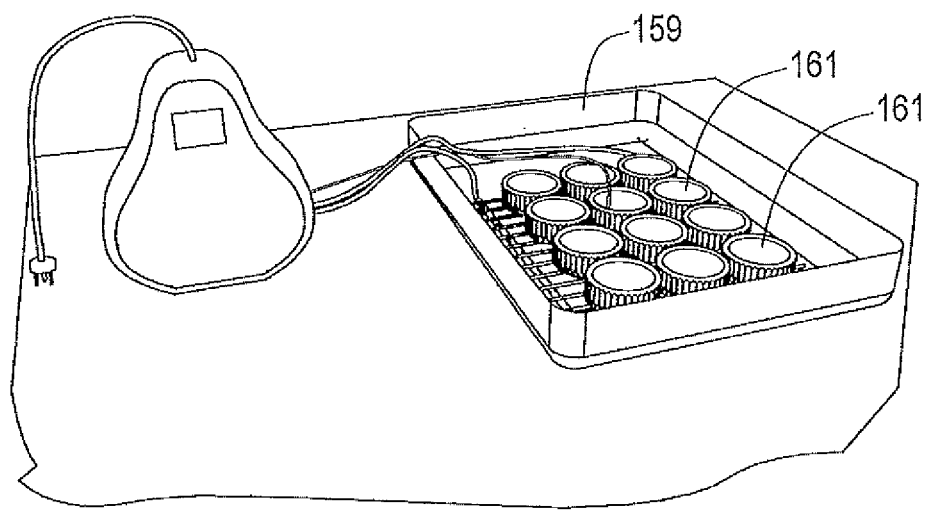
FIG. 27 is a perspective view of a "bain-marie" appliance.

FIG. 26 shows an example of a heating unit 155 where the water is circulated through tubes 156 which are part of a cooking rack 157. FIG. 27 shows a similar arrangement with a shallow tray 159, holding a plurality of custard cups 161 for bain-marle cooking.

Figure 29:
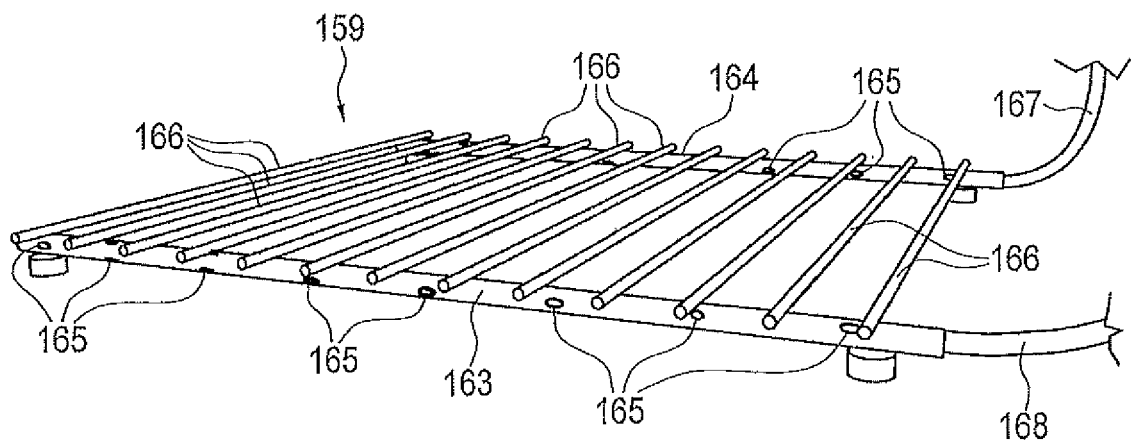
FIG. 29 is a perspective view of a cooking rack with integrated water connections.

A cooking rack accessory is shown in FIG. 29, generally at 159. It includes spaced hollow water tubes 163, 164, with openings 165 spaced therealong. Solid rack bars 166 are attached to the tubes 163, 164 along the lengths thereof. Flexible water tubes 167, 168 connect to one end of the tubes 163, 164 and extend out of the sink to a heating/control unit. Such a cooking rack can be used for both shallow cooking trays and conventional sink depths. The sink may have liquid-tight openings to which flexible water tubes and the hollow water tubes may be attached. Such an arrangement can be used for the typical sink embodiment described above.

Figure 21:
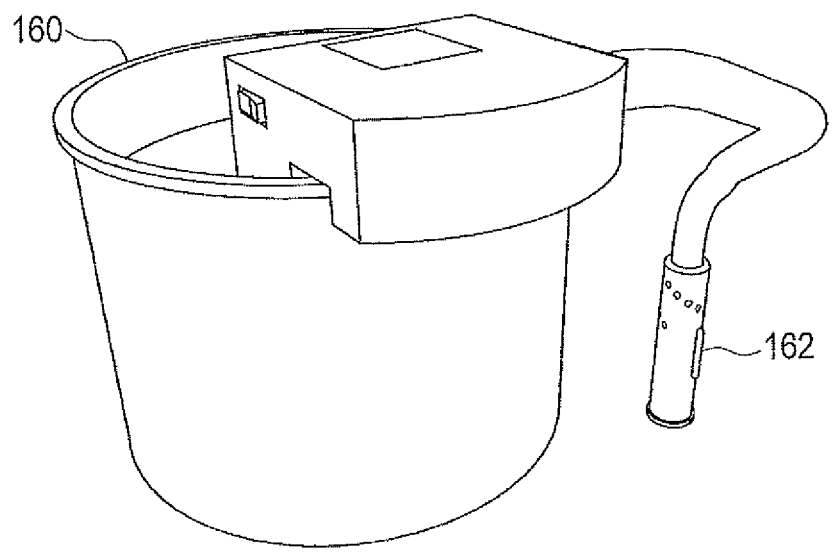
FIG. 21 is a perspective view showing a heater element with a portable liquid container.
Figure 22:
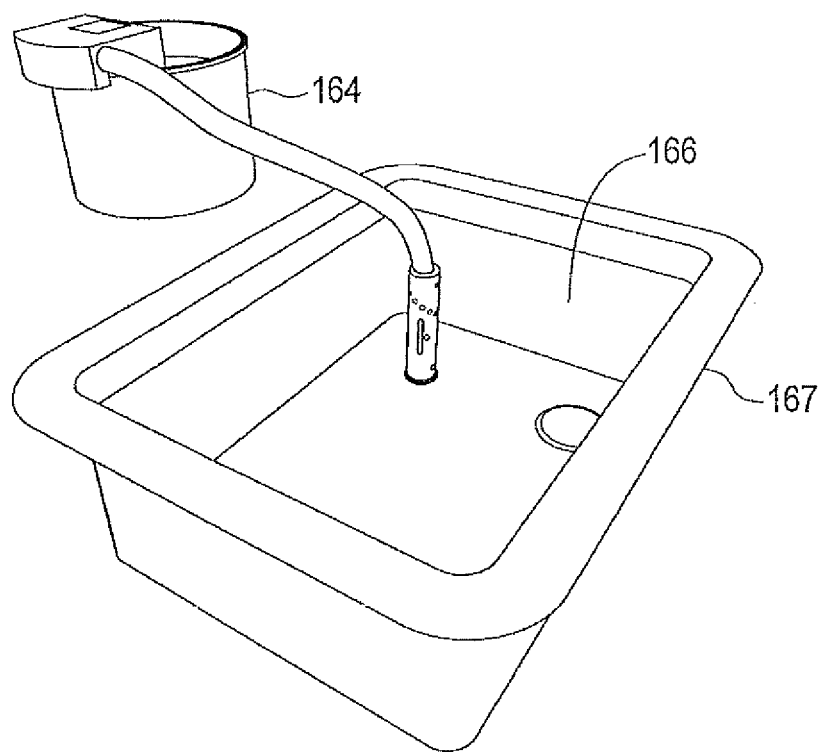
FIG. 22 is a perspective view showing a portable control system attached to a sink.

Still referring to a portable water control system, FIG. 21 includes a hot water container 160. The sensor 162 shown in FIG. 21 is used to maintain the correct level of water in the heating source. In one configuration, a pump is used, where the cold water is returned to a heating source and then passed through a heat exchanger and returned to the hot water bath 166. A temperature probe is contained in unit 162.

This portable control system can be configured or attachable to a sink 167 or another container. The control system could also be designed into a typical dedicated single purpose appliance such as a coffee maker to create a multi-use appliance. When the appliance is in the sous vide mode, the control system could use a shared water heating system, where the hot water would be transferred to a sink or container, and the cold water returned for heating. The hot water output tubes and cold water return could be detached with quick disconnect fittings when returned to the coffee mode. By turning a typical single purpose appliance into dual (or more) purpose appliance, counter space is saved and a cost savings may be realized as a result of the shared components. Conventional rice cookers, steamers or pressure cookers could also be utilized with this system.

Figure 28:
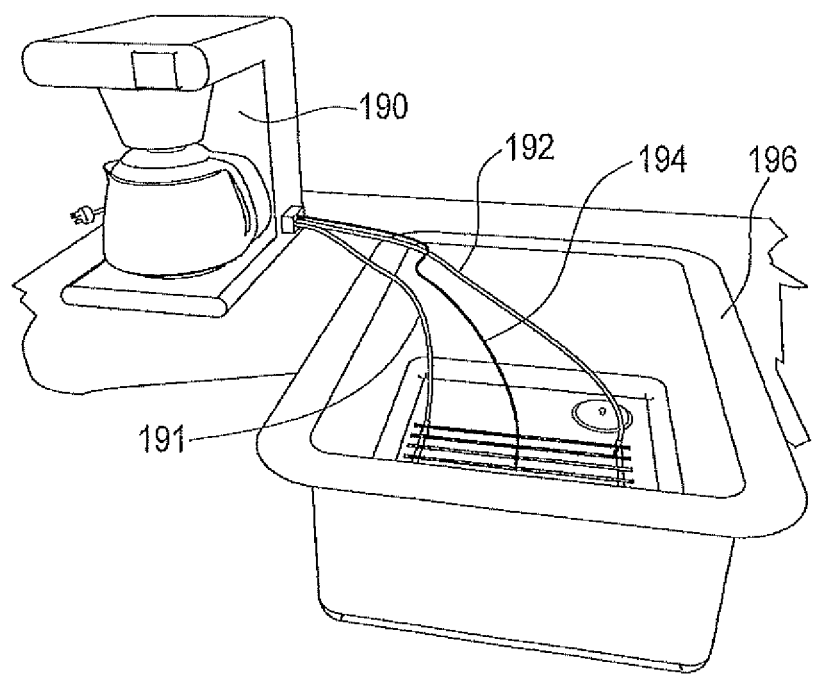
FIG. 28 is a perspective view of a coffeemaker appliance which can be used as a sous vide appliance.

Such an appliance is shown in FIG. 28. In this example, a coffeemaker 190 in one mode is a conventional coffeemaker. It also includes hot water output tube 190 and cold water return 192, which have quick disconnect fittings to the coffeemaker. Also included is a temperature sensor 194. In the arrangement of FIG. 28, a conventional sink 196 is used when the appliance is in the sous vide mode.

Figure 23:
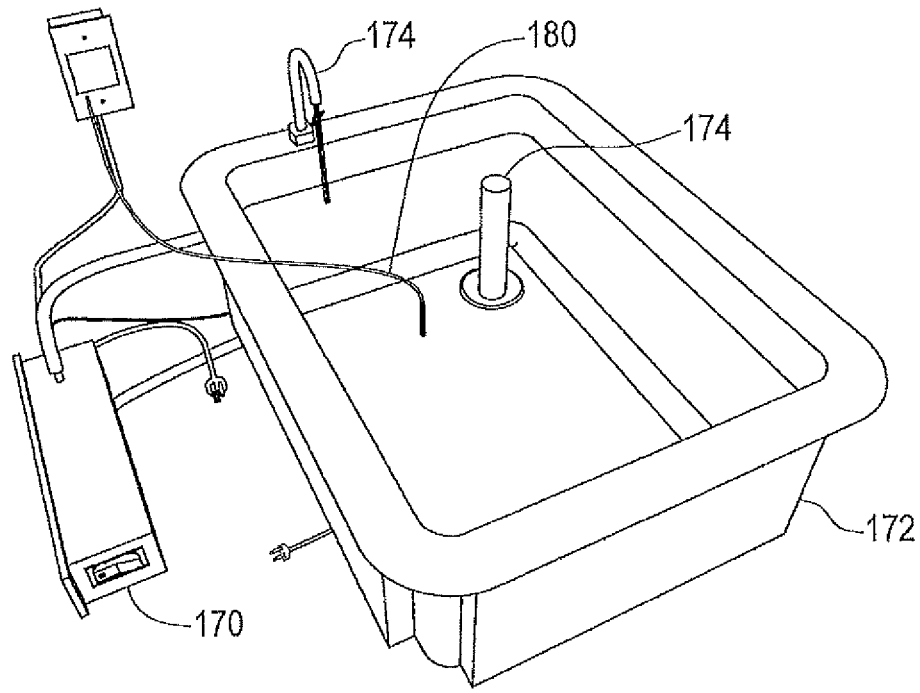
FIG. 23 is a perspective view showing a hot water dispenser used with a kitchen sink as a sous vide appliance.
Figure 24:
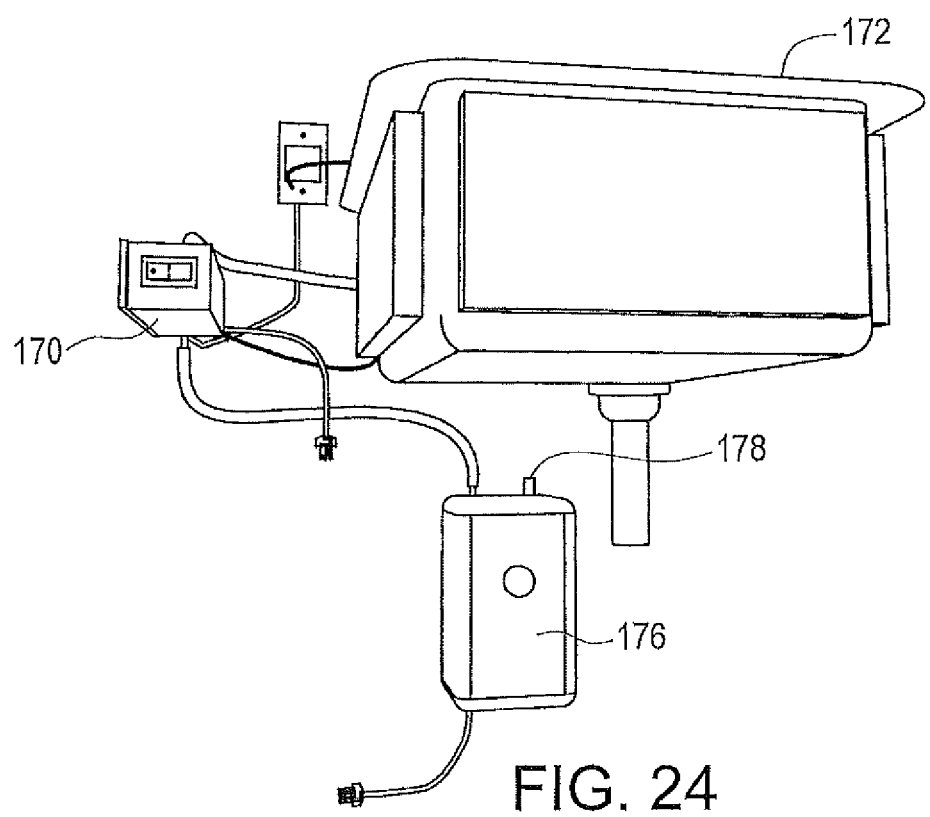
FIG. 24 is a lower perspective view of the appliance of FIG. 23 using the function of the sink faucet.

FIGS. 23 and 24 show an instant hot water dispenser as a heating source, as shown at 170 in FIG. 23 while retaining the function of the faucet, 174 in FIG. 23. Hot water is added to the sink water bath 172, with the excess water being drained into a sink drain pipe, as shown at 174. The control unit 176 operates a valve 178 to control the flow of hot water to the bath, with temperature sensors 180, which can be wired or wireless probes. In cooking situations where it is not necessary to fill an entire sink with water, a smaller container may be placed in the sink for cooking, and the excess water simply goes down the standard sink drain. Additionally, the hot water spout could be designed to pull out or to adjust the height in a way that would direct the water to reduce splashing and improve circulation. Tubing could also be attached to the faucet spout, fixture, or water tank and directed as needed to containers or accessory water distribution ports or racks.

Hence, a conventional kitchen sink or other water container can be utilized as a sous vide or bain-marie appliance. Heating units can be applied directly to the sink, for instance, or they can be a portable unit which is usable with an existing sink or other water container. The system may also be incorporated into the design or manufacturing of new sinks. Further, an instant hot water dispenser can be used which is part of an existing sink installation. Control systems and temperature sensors are used with each system to maintain the temperature of the water at the desired level in order to give the full sous vide effect. Multiple temperature zones may be controlled in the same sink or container to provide enhanced cooking techniques. In addition, a temperature sensor can be used inside the plastic bag containing the food or in some cases can be inserted directly into the item to be cooked itself. While the term water bath has been used in the descriptions, it should be understood that many liquids, gels, emulsions or phase-change materials (PCM) may be suitable for various cooking requirements and are included in this system. For example, a combination of water and cooking oil may be used. A layer of cooking oil could "float" on top of a layer of water to create more control over various thermal layers. Another technique could use temperature sensitive gels such as those made with agar, that turn from liquid to gel state below various temperatures. Using gel layers and various water layers could alter the thermal properties of each layer and provide increased flexibility for new innovative cooking techniques. Some temperature control cooking techniques might use liquids, gels, molds or containers that may be chilled or heated prior to placement in a water or liquid bath. In some situations the food itself, or portions of the food could be dipped or frozen with liquid nitrogen (−321° F.) in order to obtain the desired texture and temperature results.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A liquid based sous vide cooking system, comprising:
a kitchen sink configured for holding an amount of water, wherein the kitchen sink is adapted for washing dishes in one mode of operation, wherein the kitchen sink is fixed or fixable in position, the kitchen sink having a bottom surface and a wall or walls extending upwardly therefrom to define an interior volume for holding the amount of water, for washing dishes therein, the kitchen sink further including a conventional kitchen sink drain in the bottom surface, which is closable by a user to maintain water in the kitchen sink and openable to permit water to completely exit therefrom, the kitchen sink further including a faucet or tap external to the kitchen sink that is configured to deliver heated water at a first temperature for washing dishes therein by hand, wherein the kitchen sink is characterized by an absence of a heating unit in the interior volume, the kitchen sink including at least one heating unit external to the interior volume of the kitchen sink, adapted and controlled to heat water in the interior volume of the kitchen sink to user settable temperatures over substantially an entire temperature range of 120° F.-160° F. for sous vide cooking in the kitchen sink in a second mode of operation;
a temperature control unit coupled to the at least one heating unit;
an on/off switch for the heating unit wherein in an off position thereof, the kitchen sink is for washing dishes with the heated water in the one mode of operation, and in an on position the water in the kitchen sink is heated to the user settable temperatures over substantially the entire temperature range of 120° F.-160° F., for sous vide cooking in the second mode of operation;
a sealed cooking bag or a sealed container;
a temperature sensor arrangement providing feedback to the temperature control unit when the on/off switch is in the on position, wherein at least one sensor of the temperature sensor arrangement is adapted to monitor at least one of a second temperature of the water in the kitchen sink or a third temperature of food being cooked in the sealed cooking bag or the sealed container which is immersed in the water in the kitchen sink when the kitchen sink is used for sous vide cooking in the second mode of operation, wherein the temperature control unit is responsive to the temperature sensor arrangement together and is adapted to control the water in the kitchen sink to the user settable temperatures over substantially the entire temperature range of 120° F.-160° F., the sealed cooking bag or the sealed container being immersed in the water in the kitchen sink for a period of time when the on/off switch is the on position to cook the food in the sealed cooking bag or the sealed container to a target food temperature, wherein the target food temperature is established in accordance with the food being cooked sous vide;
a recirculation pump in fluid communication with the water in the kitchen sink, wherein the recirculation pump is removeable with respect to the kitchen sink and is repositionable throughout the interior volume of the kitchen sink for circulating the water throughout the interior volume of the kitchen sink, and wherein the recirculation pump includes a plurality of ports that are disposed at different positions and different heights around a circumference of the recirculation pump and that cause the water to circulate throughout the interior volume of the kitchen sink;
a battery that provides electric power to the recirculation pump in order to circulate the water in the kitchen sink; and
a charging port for charging the battery.

2. The liquid based sous vide cooking system of claim 1, further comprising a cooking rack for supporting the sealed cooking bag or the sealed container, positionable in the kitchen sink.

3. The liquid based sous vide cooking system of claim 1, wherein the temperature sensor arrangement is connected wirelessly to the temperature control unit.

4. The liquid based sous vide cooking system of claim 1, wherein the heating unit is attached to the wall or one of the walls of the kitchen sink or the bottom surface of the kitchen sink.

5. The liquid based sous vide cooking system of claim 1, wherein the temperature control unit is adapted to hold the water at the second temperature to maintain the food prior to the water being heated for cooking the food.

6. The liquid based sous vide cooking system of claim 1, further comprising a cooling module, wherein the food is first cooked to the target food temperature by the water and then cooler water from the cooling module is provided to the kitchen sink to chill the food after the food has been cooked and the water removed through the conventional kitchen sink drain in the kitchen sink.

7. The liquid based sous vide cooking system of claim 1, wherein the heating unit and the temperature control unit are portable as a unit and attachable to the kitchen sink, including a system for transferring heat to the kitchen sink.

8. The liquid based sous vide cooking system of claim 1, wherein the kitchen sink is a double sink.

9. The liquid based sous vide cooking system of claim 1, further comprising remote devices for setting or maintaining the third temperature, including at least one of a phone, a smart phone, a tablet device, or a computer.

10. The liquid based sous vide cooking system of claim 1, wherein the temperature sensor arrangement is a two part temperature sensor arrangement, and wherein:
the at least one sensor is included in a first part of the two part temperature sensor arrangement that obtains first sensor data indicating the second temperature of the water in the kitchen sink;
at least one second sensor is included in a second part of the two part temperature sensor arrangement that obtains second sensor data indicating the third temperature of the food being cooked in the sealed cooking bag or the sealed container; and
the first sensor data and the second sensor data are transmitted wirelessly from within the sealed cooking bag or the sealed container to the temperature control unit.

11. The liquid based sous vide cooking system of claim 10, wherein a first entirety of the first part of the two part temperature sensor arrangement is disposed within the sealed cooking bag or the sealed container and a second entirety of the second part of the two part temperature sensor arrangement is disposed within the sealed cooking bag or the sealed container.

12. The liquid based sous vide cooking system of claim 1, further comprising a container, within the interior volume, that is smaller than the kitchen sink and that contains the food being cooked in the sealed cooking bag or the sealed container, wherein at least a portion of the water is disposed in the container for cooking the food.

13. The liquid based sous vide cooking system of claim 1, further comprising an integrated heater control assembly including a first line for delivering the heated water to the kitchen sink and a second line, different than the first line, for returning cooler water to the integrated heater control assembly for reheating, wherein the cooler water is a colder temperature as compared to the heated water.

14. The liquid based sous vide cooking system of claim 1, wherein the at least one heating unit is positioned on an exterior side surface of the kitchen sink.

15. The liquid based sous vide cooking system of claim 1, wherein the at least one heating unit is a portable unit that is configured to be applied to an exterior surface of the kitchen sink.

16. The liquid based sous vide cooking system of claim 1, wherein the at least one heating unit is integrated into the kitchen sink.

17. The liquid based sous vide cooking system of claim 1, further comprising a hot water dispenser that is configured to be a source of the heated water that is delivered into the kitchen sink, wherein the hot water dispenser is coupled to a heating source that is external to the kitchen sink and that heats the heated water prior to delivery to the kitchen sink.

18. The liquid based sous vide cooking system of claim 1, wherein the temperature sensor arrangement is a two part temperature sensor arrangement, wherein a first part of the two part temperature sensor arrangement is located inside the sealed cooking bag or the sealed container and is adapted to monitor the second temperature, and wherein a second part of the two part temperature sensor arrangement, located inside the sealed cooking bag or the sealed container, is adapted to monitor the third temperature.

19. The liquid based sous vide cooking system of claim 1, wherein the recirculation pump remains at least temporarily stationary with respect to the bottom surface of the kitchen sink via one or more magnets or one or more suction cups.

20. The liquid based sous vide cooking system of claim 1, wherein the plurality of ports are arranged in a spiral configuration around the circumference of the recirculation pump, and wherein at least one port of the plurality of ports is disposed on a top surface of the recirculation pump.

* * * * *